Oct. 17, 1967 F. A. NELSON ETAL 3,348,136
GYROMAGNETIC RESONANCE APPARATUS UTILIZING
TWO-SAMPLE SIGNAL COMPARISON
Original Filed May 31, 1962 2 Sheets-Sheet 1
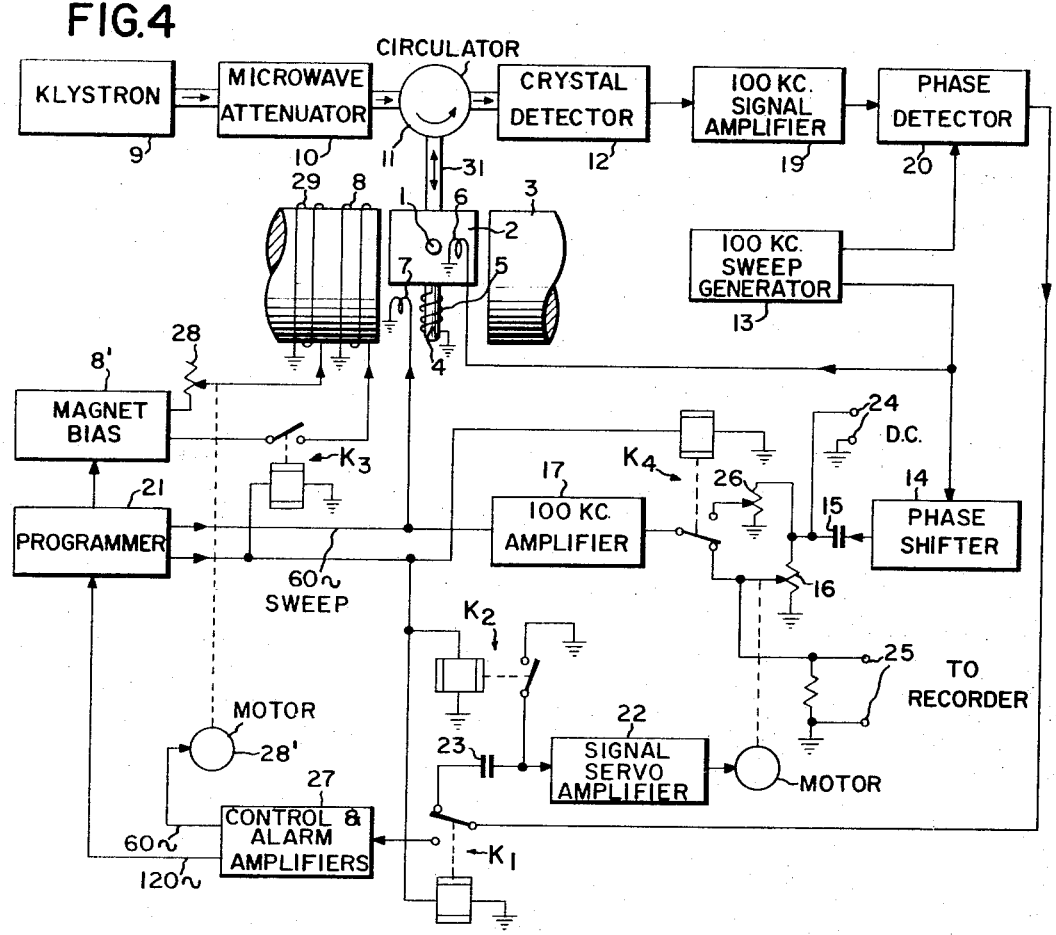
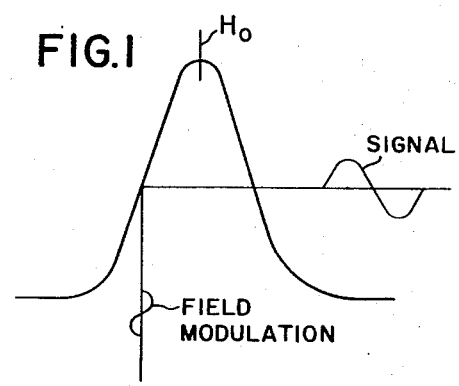
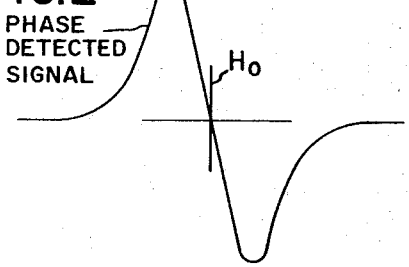
INVENTORS
FORREST A. NELSON
GEORGE A. BAKER
BY
ATTORNEY

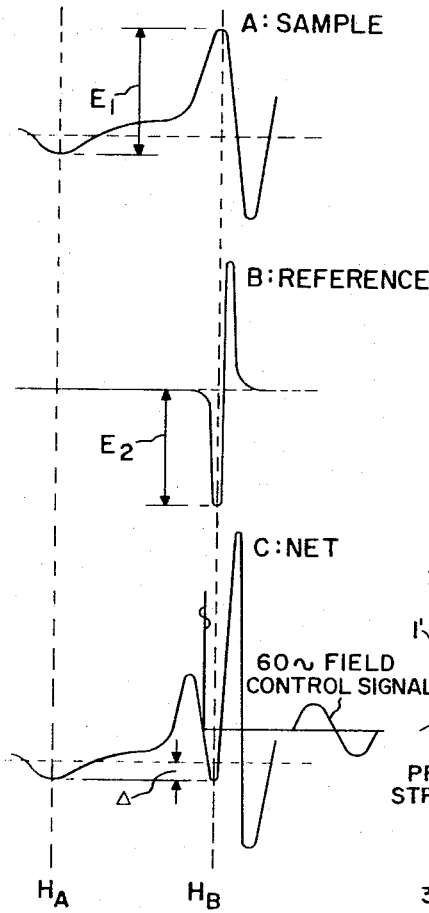
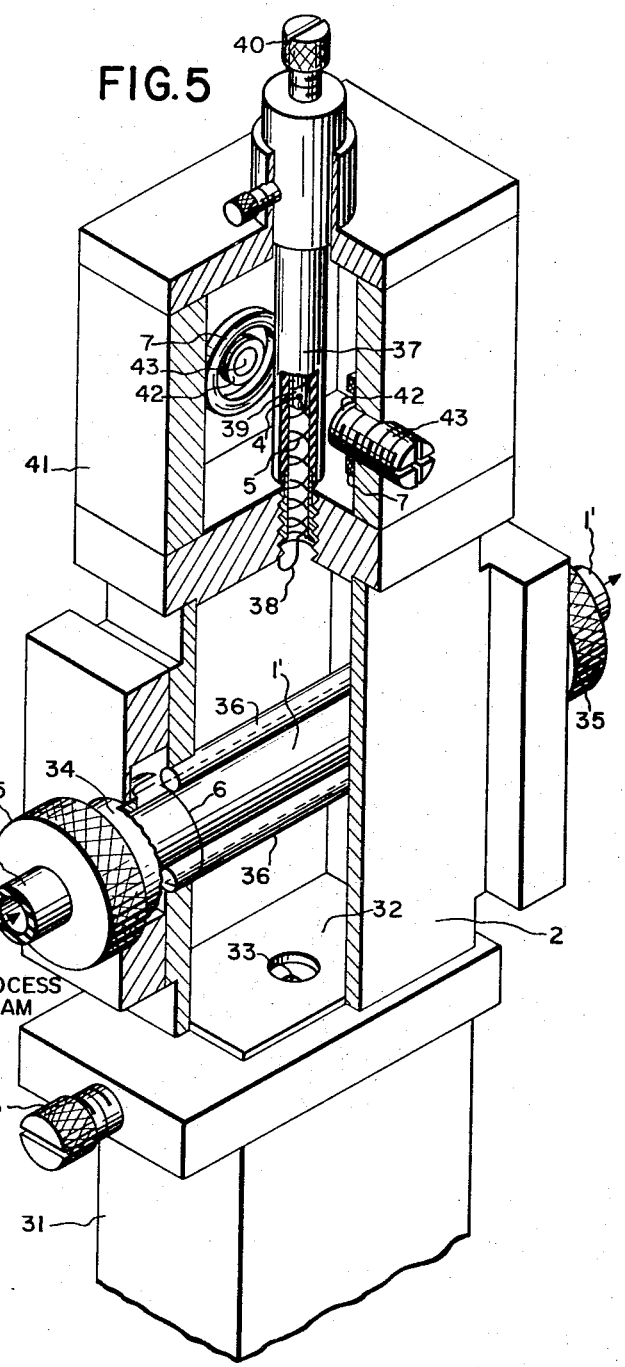

United States Patent Office 3,348,136
Patented Oct. 17, 1967

3,348,136
GYROMAGNETIC RESONANCE APPARATUS UTILIZING TWO-SAMPLE SIGNAL COMPARISON
Forrest A. Nelson, Palo Alto, and George A. Baker, San Carlos, Calif., assignors to Varian Associates, Palo Alto, Calif., a corporation of California
Continuation of abandoned application Ser. No. 198,898, May 31, 1962. This application May 5, 1965, Ser. No. 453,441
18 Claims. (Cl. 324—.5)

This application is a continuation of copending application Serial No. 198,898 filed May 31, 1962, and now abandoned in favor of the present application.

The present invention relates in general to gyromagnetic resonance, and in particular to novel apparatus for obtaining signals from two samples.

It is well known that the amount of power absorbed by a sample at gyromagnetic resonance can provide an indication of the concentration of gyromagnetic particles in the sample. When such measurements are made at microwave frequencies, as in the case of electron paramagnetic resonance, accurate comparison between successive samples is exceedingly difficult due to errors resulting from sample-dependent changes in leading which affect such parameters as the cavity match, cavity Q, microwave phases and resonant frequency of the resonator structure used for irradiating the sample.

An object of the present invention is provision of apparatus for obtaining electron paramagnetic resonance amplitude measurements which are substantially independent of cavity loading conditions.

Another object of the present invention is the provision of a novel signal comparison technique whereby resonance signals are measured by varying the amplitude of field modulation at a reference sample.

Another object of the present invention is the provision of a novel technique for comparing the amplitude of adjacent lines in the electron paramagnetic resonance spectrum of a sample, such technique being particularly useful for monitoring the stream concentration of vanadium in an oil refining process.

Still another object of the present invention is the provision of a novel structure for obtaining electron paramagnetic resonance signals from an unknown sample and a reference sample wherein the reference sample is disposed in an open slow-wave structure with local field modulating coils.

The present invention is directed to an apparatus that serves to detect the concentration of an element in an unknown sample by comparing the varying amplitude of modulation applied to a reference sample simultaneously with a modulation of fixed amplitude that is applied to the unknown sample that is being measured. The modulation amplitudes are compared and the reference modulation is automatically varied until its amplitude equals the fixed amplitude of the modulation to the unknown sample, whereby a null is established. At this point, the position of a calibrated potentiometer related to such varying amplitude, indicates the amount or concentration of the unknown sample. The reference and unknown samples are both excited by the same microwave field, the unknown sample being within a cavity resonator whereas the reference sample is disposed externally thereto within a helix that is electromagnetically coupled to the resonator. Changes in parameters of the system, such as amplifier gain, microwave power, field modulation, or Q of the resonant cavity affect both signals to the same extent. Nevertheless, the reference sample signal can be controlled without affecting the signal from the unknown sample. In effect, the signals from the reference sample and the unknown sample are observed simultaneously, added algebraically by adjustment of the phase of the modulation applied to the reference sample, and then compared by observing a null which is obtained when the signals are of equal and opposite intensity.

These and other features and advantages of the present invention will be more apparent after a perusal of the following specification taken in connection with the accompanying drawings wherein:

FIGS. 1 through 3 are signal trace diagrams utilized in the explanation of the present invention;

FIG. 4 is a block diagram of a system in accordance with the present invention for use in the monitoring of vanadium concentration in an oil refining process, and FIG. 5 is an isometric view, partially broken away, of a two-sample excitation structure in accordance with the present invention.

The signal comparison technique of the present invention will be generally described by reference to FIG. 1 and FIG. 2. FIG. 1 represents a plot of the absorption of fixed-frequency microwave power by a typical paramagnetic sample as the polarizing magnetic field intensity goes through the resonance value $H_O$. If a small modulation field, of amplitude less than the resonance linewidth, is superimposed on the polarizing field, a signal at the field modulation frequency is amplitude-modulated onto the irradiating microwaves. When this signal (after microwave detection) is phase-detected with a reference signal at the modulation frequency, the D.C. output as a function of polarizing field is of the form shown in FIG. 2, substantially the derivative of the curve of FIG. 1.

With the polarizing field in the region of maximum (or minimum) slope, the amplitude of modulation frequency signal varies in a substantially linear manner with the amplitude of the field modulation. For example, if the amplitude of field modulation in FIG. 1 were doubled, this would result in a doubling of the modulation frequency signal amplitude in FIG. 1 and of the peak-to-peak amplitude of the phase-detected signal of FIG. 2. Thus, if an unknown sample with a fixed amplitude of field modulation and a reference sample with a variable amplitude field modulation are simultaneously excited in the same polarizing field, the amplitude of reference sample modulation required for equal signal from the two samples provides a measure of the unknown sample signal. If the exciting structure for the reference sample is electromagnetically coupled to the exciting structure for the unknown sample, this measurement will be substantially independent of sample-dependent loading conditions. Various signal comparison techniques may be used, including signal balancing to produce a null indication, or continuously field modulating the samples at different frequencies.

The above measurement technique is particularly useful in monitoring the concentration of paramagnetic particles for process control purposes. For example, recent investigations by Saraceno et al. reported in "Analytical Chemistry," vol. 33, pp. 500–505 (April 1961), show that the concentration of vanadium traces in petroleum oils may be measured by the amplitude of electron resonance signals from paramagnetic vanadium ions in the +4 oxidation state. Such information is valuable in connection with oil refining processes, since the presence of vanadium in oil distillates contaminates cracking catalysts by contributing to carbon and hydrogen formation.

FIG. 3A shows a portion of the phase-detected vanadium +4 derivative spectrum obtained from a petroleum sample, exhibiting two closely-spaced hyperfine-split lines. As disclosed in the above-cited article, a sensitive measure of vanadium concentration is obtained from $E_1$, the positive peak signal of the stronger high field line at $H_B$ relative to the negative peak signal of the weaker low field line at $H_A$.

FIG. 4 is a block diagram of a process monitoring system according to the present invention wherein the vanadium concentration measurement illustrated in FIG. 3A is made by introducing a nulling signal $E_2$ of FIG. 3B from a reference sample which is subjected to a modulation field of variable amplitude. A petroleum sample 1 is continuously pumped from the process stream through a quartz tube 1' in a rectangular cavity resonator 2 which is positioned in the unidirectional polarizing field of a magnet 3. To ensure good spectral resolution, the temperature of the incoming sample is preferably maintained below 20° C. The reference sample 4, such as a small quantity of diphenylpicrylhydrazyl (DPPH), is supported within a helix 5 mounted outside of the cavity 2 but electromagnetically coupled thereto to provide microwave excitation for the sample 4. The reference sample is characterized by a strong, moderately narrow, resonance line which permits the helix to be loosely coupled to the cavity; it does not saturate with moderate RF power; and it has a signal amplitude which is linear with modulation amplitude over a range on the order of 100 to 1. Each of the samples 1 and 4 is subjected to the field of separate modulating coils 6 and 7 respectively. Magnet coil 8 is periodically biased to shift the polarizing field from $H_A$ to $H_B$, and the modulation amplitude of the reference sample 4 is adjusted so that the net signal, FIG. 3C, is equal at each field value ($E_2=E_1$). The modulation amplitude so required provides a direct indication of the vanadium content of sample 1.

More generally, and referring to paramagnetic samples in general (not just vanadium), it is desirable to compare the reference-sample opposed peak of the derivative spectrum output with a stable reference value. If the zero level of the phase detector output is sufficiently stable, this may be used as the reference. However, it is often simpler to use an adjacent peak for a reference as this does not impose stringent requirements on the stability of the phase detector. Furthermore, these adjacent peaks may arise from either the opposite slopes of the same absorption line, or from entirely different lines as in FIG. 3. When adjacent peak comparison is used, the amplitude of the reference-sample opposed peak, at the condition of balance, is equal to a reference value which is the amplitude of the unopposed peak. For example, in FIG. 3, this reference value is seen to be Δ, the amplitude of the unopposed negative peak at $H_A$. In the case of a zero level comparison, this reference value is zero.

The detailed operation of the system of FIG. 4 will now be described. Klystron oscillator 9 provides a microwave output at a frequency of approximately 9.5 kmc., which is coupled by attenuator 10 and three-port circulator 11 to the cavity resonator 2, thereby effecting electron paramagnetic resonance of samples 1 and 4 in the approximately 3400 gauss polarizing field of magnet 3. The absorption of energy due to resonance changes the amount of energy reflected from the cavity resonator, thereby changing the power level monitored by the crystal detector 12 at the third port of the circulator 11. A 100 kc. sweep generator 13 provides the excitation for field modulation coils 6 and 7. The signal to modulation coil 7 is reversed in phase by phase shifter 14 so that the modulation frequency signal of the sample 4 opposes that of sample 1, and then proceeds via coupling capacitor 15, motor-driven potentiometer-attenuator 16, and 100 kc. reference amplifier 17.

The monitored power absorption by crystal detector 12 at the 100 kc. modulation frequency is amplified by amplifier 19 and compared in phase detector 20 with a reference signal from the sweep generator 13. The output of the phase detector 20 is thus a D.C. signal which varies with polarizing field intensity according to the curve of FIG. 3C.

Programmer 21 includes a conventional timing mechanism for opening and closing the relays $K_2$ and $K_3$ with a period on the order of 4 seconds. With relay $K_3$ in the open position, the field of the magnet 3 is at the valve $H_A$. The relay $K_2$ is simultaneously in the closed position so that the input to servo-amplifier 22 is clamped to ground whereby coupling capacitor 23 charges to the signal output voltage of the phase detector 20 at $H_A$. Next, the relay $K_3$ is closed whereby the bias source 8' cycles the field to the value $H_B$. The relay $K_1$ is momentarily opened by the programmer 21 during the cycling to remove any transient signal from the amplifier 22. The relay $K_2$ is now open so that the signal output of the phase detector 20 at $H_B$ is applied to the coupling capacitor 23. If any deviation exists between the signal outputs at $H_A$ and $H_B$ the capacitor 23 will either charge or discharge through the amplifier 22, depending upon the direction of the deviation. Thus, the output of amplifier 22 drives the potentiometer 16, changing the amplitude of the reference sample modulation until the net signal at $H_B$ is equal to that at $H_A$ and the input to the amplifier 22 is nulled. The position of the potentiometer 16 can then be calibrated in terms of the vanadium content of the oil sample 1, and, by applying a D.C. voltage to the terminals 24, this potentiometer position may be continuously recorded at terminals 25.

On the order of once every ten minutes, the programmer 21 switches the relay $K_3$ to increase the magnet field from $H_A$ to $H_B$ for about 20 seconds and simultaneously switches on a small 60 cycle signal to coil 7 which field modulates the reference sample 4. Also, the relay $K_1$ switches the output of phase detector 20 to 60 cycles and 120 cycle amplifier 27; relay $K_2$ closes thereby grounding the input to servo-amplifier 22; and relay $K_4$ is switched to potentiometer 26 to ensure a high signal level from the reference sample. As can be seen from FIG. 3C, the 60 cycle field modulation results in a 60 cycle signal from the phase detector 20 whenever the field $H_B$ deviates from the exact resonance value, the phase of the signal being dependent upon the direction of the deviation. This error signal is amplified by amplifier 27 and applied to motor 28' which adjusts the energization of a bias field coil 29, via potentiometer 28, until the magnet field intensity is exactly at $H_B$, thereby compensating for any field or frequency drifts. The current required through coil 8 to shift the magnet field from $H_A$ to $H_B$ is nearly independent of the absolute value of the field, at least over the range of interest, so that when the current is removed the field will return to $H_A$. Therefore, both field values $H_A$ and $H_B$ are determined and controlled.

With the system at exact resonance, a 120 cycle signal will result from the 60 cycle field modulation due to a phase reversal as the field passes through the resonance value during the modulation cycle. At the beginning of the field control period, an alarm time delay relay is energized by the programmer 21 and is held off by the 120 cycle signal. If a loss of signal has occurred, the alarm relay will be locked down and an alarm circuit actuated to indicate possible malfunctioning of the process monitoring apparatus.

FIG. 5 illustrates in greater detail the construction of the sample-holding structure of the system of FIG. 4. Waveguide 31 from the circulator 11 is coupled to rectangular cavity resonator 2 by an iris plate 32 to excite a TE mode with magnetic field perpendicular to the polarizing field of magnet 3. Loading screw 33 varies the iris coupling so that a suitable bias level power is reflected to the crystal detector 12. The quartz sample tube 1' passes through the center of the cavity resonator via metal stacks 34 which are dimensioned as waveguides beyond cutoff to prevent leakage of microwave power, and is secured by collets 35 which are mounted in the stacks. The stream sample modulating coil 6 is passed through thin microwave-shielding tubes 36 extending between the narrow walls of the resonator in close proximity to the tube 1'.

The helix 5 is mounted within a rotatable plastic tube 37 and is terminated in a magnetic coupling loop 38 extending into the cavity resonator 2, the amount of coupling being varied by translation and rotation of the tube 37. The DPPH reference sample 4 is contained in the end of a quartz tube 39 mounted on a screw adjustment 40 so that it may be adjusted axially within the helix for proper phasing with the microwave field in the cavity and for positioning the sample near the center of the reference sample modulating coils 7 which are mounted on the walls of magnetically-shielding, helix housing 41. The small sample 4 is packed with powdered potassium chloride to prevent movement.

Since the field required for resonance of the reference sample 4 is approximately 28 gauss higher than that required for resonance at the strongest vanadium line, the field at the reference sample must be biased locally to a higher value in order to obtain resonance from both samples simultaneously. This is accomplished by two small iron rings 42 mounted on brass slugs 43 which screw into the walls of the helix housing 41 and are adjusted to give the desired simultaneous resonance with the magnet at cycling position $H_B$. A fine adjustment of the bias is obtained by passing a small DC current through the modulating coils 6 and 7.

The helix 5 is one of a class of structures, known in the microwave transmission art as open slow-wave structures, which are characterized by their ability to propagate a microwave frequency wave at a phase velocity considerably below the speed of light. As a result, a highly concentrated microwave magnetic field is provided in a compact and simple structure, thereby permitting the use of a small reference sample which can yield a highly resolved spectral line due to lack of magnetic field variations thereacross, and also facilitating the shielding of the reference sample from the unknown sample modulation field. Moreover, the open, field-penetrable configuration of the slow-wave structure permits the use of a localized, low intensity, high frequency, field modulation for the reference sample which does not appreciably disturb the unknown sample. It should be noted that in the system of FIG. 4, the reference sample signal is used for both signal comparison and field-frequency control purposes. When the reference sample is used exclusively for field-frequency control or for field-frequency spectrum marking, it may be desirable to provide decoupled microwave excitation and detection for the two samples.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring the concentration of a paramagnetic species in an unknown sample, comprising: means for accommodating said unknown sample in a microwave excitation structure; means for accommodating a paramagnetic reference sample in a microwave excitation structure in electromagnetic coupling relation relative to the microwave structure of said unknown sample; means for producing a D.C. polarizing magnetic field enveloping both samples; means for effecting an electron paramagnetic resonance signal of said reference sample and of said unknown sample simultaneously; a means for simultaneously comparing the amplitude of said reference and unknown sample signals; and means for balancing such compared signals to provide a null whereby an indication of the concentration of unknown sample is obtained.

2. Apparatus according to claim 1, including: means applying a separate magnetic field modulation simultaneously to each sample for obtaining modulation frequency signals from said samples; and means for automatically varying the amplitude of the field modulation applied to the reference sample, said amplitude of field modulation applied to the reference sample thereby providing the desired concentration measurement.

3. Process monitoring apparatus, comprising: means for continuously passing a fluid stream sample of said process through a cavity resonator; a magnet for subjecting said sample to a unidirectional polarizing magnetic field; an open slow-wave structure disposed external to said cavity resonator but electromagnetically coupled thereto for receiving electromagnetic energy therefrom; a reference sample disposed within said slow-wave structure; means exciting said cavity resonator with microwave power for effecting electron paramagnetic resonance absorption of said samples; and means for simultaneously comparing the amplitude of resonance absorption signals from said samples thereby providing a measure of the concentration of a paramagnetic species in said fluid stream.

4. Apparatus according to claim 3 wherein said fluid stream sample is taken from an oil refining process; said sample resonance absorption being caused by vanadium ions in the +4 oxidation state whereby said measurement indicates the concentration of vanadium in the process stream.

5. Apparatus according to claim 3 wherein said reference sample resonance has a derivative spectral line peak coincident with the stronger of two adjacent derivative spectral line peaks of said fluid stream resonance, and further including: means applying a separate magnetic field modulation to each sample for obtaining modulation frequency signals from said samples; and field modulation being of opposite phase whereby the signals from said coincident spectral line peaks oppose each other; means for periodically cycling the intensity of said magnet from one of said adjacent spectral line peaks to the other; means sampling the net signal of said samples at each extreme of said magnet cycling for generating a signal which varies in accordance with the difference between said sampled signals; and means responsive to said last-named signal for varying the amplitude of field modulation applied to said reference sample until said signal is nulled, said amplitude providing the desired concentration measurement of the paramagnetic species in said fluid stream.

6. Apparatus according to claim 5 wherein said paramagnetic species is vanadium and said reference sample is a small quantity of diphenylpicrylhydrazyl, and further including: means for locally biasing the polarizing field at said reference sample for effecting the desired coincidence of spectral lines.

7. Apparatus according to claim 5, further including: means for periodically halting the cycling of said magnet at said reference sample opposed peak; means for then applying an additional modulation to the field of said magnet; and means responsive to resonance signals at the frequency of said additional modulation for adjusting the intensity of said magnet field to the exact resonance frequency of said opposed line.

8. Apparatus according to claim 7, further including: means responsive to resonance signals at twice said additional modulation frequency for providing an indication of whether the apparatus is functioning properly.

9. Apparatus according to claim 8 wherein said unknown sample excitation means is a cavity resonator adapted to accommodate said unknown sample therein.

10. A gyromagnetic resonance apparatus comprising: a cavity resonator; means for applying a microwave signal to said cavity resonator; an unknown sample tube disposed within said cavity resonator; a reference sample tube disposed externally relative to said cavity resonator, the longitudinal axis of said reference tube being substantially perpendicular to the longitudinal axis of the unknown sample tube; a magnet for supplying a unidirectional polarizing field to both of said samples; a magnet coil coupled to said magnet for periodically biasing such polarizing field and for shifting such field between two predetermined values; and a helix wound around the reference sample tube, said helix being electromagnetically coupled to said cavity resonator for exciting the reference sample.

11. A gyromagnetic resonance apparatus as in claim 10 further including means for adjusting the reference sample tube axially within said helix.

12. A gyromagnetic resonance apparatus as in claim 10, wherein a first modulation coil is disposed adjacent to said unknown sample; a second separate modulation coil is disposed adjacent to said reference sample; and including means for automatically adjusting the amplitude of modulation of the magnetic field applied to the reference sample.

13. A gyromagnetic reference apparatus as in claim 12, wherein said automatic adjustment means includes a capacitor, and a potentiometer that is responsive to the output from such capacitor.

14. Apparatus for measuring the amplitude of gyromagnetic resonance signals of an unknown sample subject to changes in gyromagnetic resonance, said unknown sample and a gyromagnetic resonance reference sample being adapted for simultaneous positioning in the same unidirectional polarizing magnetic field, comprising: first electromagnetic means for exciting said unknown sample to gyromagnetic resonance; second electromagnetic means for simultaneously exciting said reference sample, said first and second electromagnetic means being electromagnetically coupled; means for applying separate, independent, and cyclically varying magnetic field modulation simultaneously to each sample for obtaining modulation frequency signals from said samples; means for comparing the amplitudes of said reference sample signal and said unknown sample signal; and means for separately and automatically varying the amplitude of said cyclical field modulation applied to the reference sample relative to the amplitude of said cyclical field modulation applied to the unknown sample for making the difference between said compared signals equal to a reference value, the amplitude of field modulation applied to the reference sample thus providing the desired signal amplitude measurement.

15. Apparatus according to claim 14 wherein said first electromagnetic means is a cavity resonator and said unknown sample is disposed within said cavity resonator.

16. Apparatus according to claim 15 wherein said second electromagnetic means is an open slow-wave structure disposed external to said cavity resonator and said reference sample is disposed within said slow-wave structure.

17. Apparatus for use in obtaining electron paramagnetic resonance signals from an unknown sample and a reference sample in a common polarizing magnetic field, comprising: means including a cavity resonator for exciting resonance in said unknown sample; an open slow-wave structure external to and electromagnetically coupled to said cavity resonator and encompassing said reference sample only, for exciting resonance of said reference sample with electromagnetic energy coupled from said cavity resonator; a first magnetic field modulating coil means for providing a modulating field at said unknown sample to produce an unknown sample signal; a second magnetic field modulation coil means mounted adjacent to said slow-wave structure for providing a low intensity modulating field localized at said reference sample simultaneously with said first modulating field provided to said unknown sample; means for periodically biasing the common polarizing magnetic field to provide a reference sample signal for comparison with said unknown sample signal; means for comparing the amplitudes of said unknown sample signal and said reference sample signal; and means for adjusting the modulating field provided to said reference sample for making the difference between said compared signals equal to a reference value.

18. A gyromagnetic resonance apparatus comprising: a cavity resonator; an unknown gyromagnetic sample disposed within said cavity resonator; a reference gyromagnetic sample disposed externally relative to said cavity resonator; means for providing a unidirectional polarizing magnetic field irradiating both of said samples; a helical coil encompassing said reference sample, said coil being electromagnetically coupled to said cavity resonator; means for applying a microwave signal to said cavity resonator and via said cavity resonator to said coil to produce gyromagnetic resonance signals from said unknown sample and said reference sample; and means for comparing said gyromagnetic resonance signals to determine that the difference between said signals is equal to a predetermined value.

References Cited

UNITED STATES PATENTS

| 2,792,548 | 5/1957 | Hershberger | 324—58.5 |
| 2,962,585 | 11/1960 | Bolef et al. | 330—4 |
| 3,087,888 | 4/1963 | Saraceno. | |
| 3,127,556 | 3/1964 | Gielow et al. | 324—5 |

OTHER REFERENCES

Feher et al.: Physical Review vol. 98, No. 2, Apr. 15, 1955, pp. 337–348 incl.

The Review of Scientific Instruments (Q–184.R5) as follows: (1) Mattuck et al., vol. 29, No. 8, Aug., 1958, pp. 717–721. (2) Mock, vol. 31, No. 5, May, 1960, pp. 551–555. (3) Hiller et al. vol. 32, No. 7, July, 1961 pp. 796–798.

Townes et al.: Microwave Spectroscopy, McGraw-Hill, New York, 1955, pp. 418, 419, 424, and 425 principally relied on.

RUDOLPH V. ROLINEC, *Primary Examiner.*

MAYNARD R. WILBUR, *Examiner.*

M. J. LYNCH, *Assistant Examiner.*